(12) United States Patent
Ma et al.

(10) Patent No.: US 9,116,395 B1
(45) Date of Patent: Aug. 25, 2015

(54) LIQUID CRYSTAL DISPLAY PANEL ALIGNMENT AND SEPARATION

(71) Applicants: BOE Technology Group Co., Ltd., Beijing (CN); Beijing BOE Display Technology Co., Ltd., Beijing (CN)

(72) Inventors: Guojing Ma, Beijing (CN); Yongzhi Song, Beijing (CN); Chengming Zhao, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/446,625

(22) Filed: Jul. 30, 2014

(30) Foreign Application Priority Data

Feb. 18, 2014 (CN) .......................... 2014 1 0054875

(51) Int. Cl.
*H01J 9/00* (2006.01)
*G02F 1/1337* (2006.01)

(52) U.S. Cl.
CPC ...... *G02F 1/13378* (2013.01); *G02F 1/133723* (2013.01); *G02F 2001/133792* (2013.01)

(58) Field of Classification Search
CPC .............. G02F 1/3378; G02F 1/33723; G02F 2001/133792
See application file for complete search history.

(56) References Cited

U.S. PATENT DOCUMENTS

2008/0088781 A1 * 4/2008 Jung et al. ..................... 349/123

* cited by examiner

*Primary Examiner* — Joseph L Williams
(74) *Attorney, Agent, or Firm* — Westman, Champlin & Koehler, P.A.

(57) ABSTRACT

A method of manufacturing a liquid crystal display panel avoids or reduces non-uniformity in an alignment layer in a liquid crystal display panel so as to achieve a liquid crystal display panel meeting process requirements for a narrow bezel or super narrow bezel design. The method includes the steps of: forming a first alignment layer on a first mother plate entirely covering the first mother plate; forming a second alignment layer on a second mother plate entirely covering the second mother plate; and celling and then cutting the first mother plate formed with the first alignment layer and the second mother plate formed with the second alignment layer, so as to form at least two liquid crystal display panels separated from each other.

8 Claims, 3 Drawing Sheets

LIQUID CRYSTAL DISPLAY PANEL ALIGNMENT AND SEPARATION

CROSS-REFERENCE TO RELATED APPLICATION

This application claims the benefit of Chinese Patent Application No. 201410054875.X filed on Feb. 18, 2014 in the State Intellectual Property Office of China, the whole disclosure of which is incorporated herein by reference.

BACKGROUND

1. Field of the Invention

Embodiments of the present invention relate to field of liquid crystal display, and particularly, to a method of manufacturing a liquid crystal display panel.

2. Description of the Related Art

In a process of manufacturing a liquid crystal display panel, a plurality of liquid crystal display panels are first formed from a large-size mother plate, and then cut into individual liquid crystal display panels having a finally desired dimension. Before forming the plurality of individual liquid crystal display panels from the mother plate, alignment layers are usually formed on areas of the mother plate corresponding to each of liquid crystal display panels, respectively.

Generally, as shown in FIG. 1, a process of forming an alignment layer includes a step of coating a plurality of separated alignment layers 200 on the mother plate, each alignment layer 200 corresponding to a single liquid crystal display panel. Specifically, each alignment layer 200 is formed by coating liquid alignment material on the mother plate 100 and evaporating solvent from the liquid alignment material by a thermally curing process. However, during the evaporation process, the solvent near the edge of each alignment layer is evaporated more rapidly than that near the central area. Meanwhile, due to a surface tension action of the liquid alignment material, solute in the liquid alignment material is apt to cumulate at the edge of the alignment layer, which results in non-uniformity in thickness of the alignment layer between the edge areas and the central area. The edge areas thus appear a rough/irregular structure as shown in FIG. 2. FIG. 2 is an enlarged local cross-section schematic view along line A-A of an alignment layer on the mother plate shown in FIG. 1.

After celling and then cutting the mother plate provided with the alignment layer, the resultant liquid crystal display panel is apt to have a broken surface at the edge area thereof, which limits the design of a seal area for applying a seal agent thereon. Particularly, there are strict limitations on width and thickness of bezel areas for a twisted nematic liquid crystal display panel having a narrow bezel or super narrow bezel, thus, a non-uniformity area in the edge of the alignment layer and an excessive bezel width both adversely affect the design of the bezel areas of a twisted nematic liquid crystal display panel having a narrow bezel or super narrow bezel, such adverse effect making process requirements for a narrow bezel or super-narrow bezel unsatisfied.

SUMMARY

It is an objective of the embodiments of the present invention to provide a method of manufacturing a liquid crystal display panel, which avoids or reduces non-uniformity in an alignment layer in a liquid crystal display panel so as to meet process requirements for a liquid crystal display panel having a narrow bezel or super narrow bezel.

According to an embodiment of an aspect of the present invention, there is provided a method of manufacturing a liquid crystal display panel, comprising steps of:

forming a first alignment layer on a first mother plate entirely covering the first mother plate;

forming a second alignment layer on a second mother plate entirely covering the second mother plate; and ceiling and then cutting the first mother plate formed with the first alignment layer and the second mother plate formed with the second alignment layer, so as to form at least two liquid crystal display panels separated from each other.

According to another aspect of the present invention, there is provided a liquid crystal display panel, which is manufactured by the above method of manufacturing a liquid crystal display panel.

BRIEF DESCRIPTION OF DRAWINGS

The above and other features of the present invention will become more apparent by describing in detail exemplary embodiments thereof with reference to the accompanying drawings, in which.

DETAILED DESCRIPTION OF EMBODIMENTS

Exemplary embodiments of the present disclosure will be described hereinafter in detail with reference to the attached drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of embodiments of the present invention, there is provided a method of manufacturing a liquid crystal display panel and a liquid crystal display panel, which may avoid or reduce non-uniformity in an alignment layer on the liquid crystal display panel and thus meet process requirements for a liquid crystal display panel having a narrow bezel or super-narrow bezel.

Based on a color filter substrate or an array substrate that has been completed, a process flow of manufacturing a liquid crystal display panel according to an embodiment of the present invention generally comprises in order the following three steps: an aligning step, a liquid crystal dripping as well as curing and celling step, and a cutting step. The aligning step mainly includes a step of forming an alignment layer on a mother plate.

The mother plate according to embodiments of the present invention may comprise a mother plate for producing an array substrate, and/or a mother plate for producing a color filter substrate. The mother plate may be generally made of a glass or other suitable materials.

Figure 1:
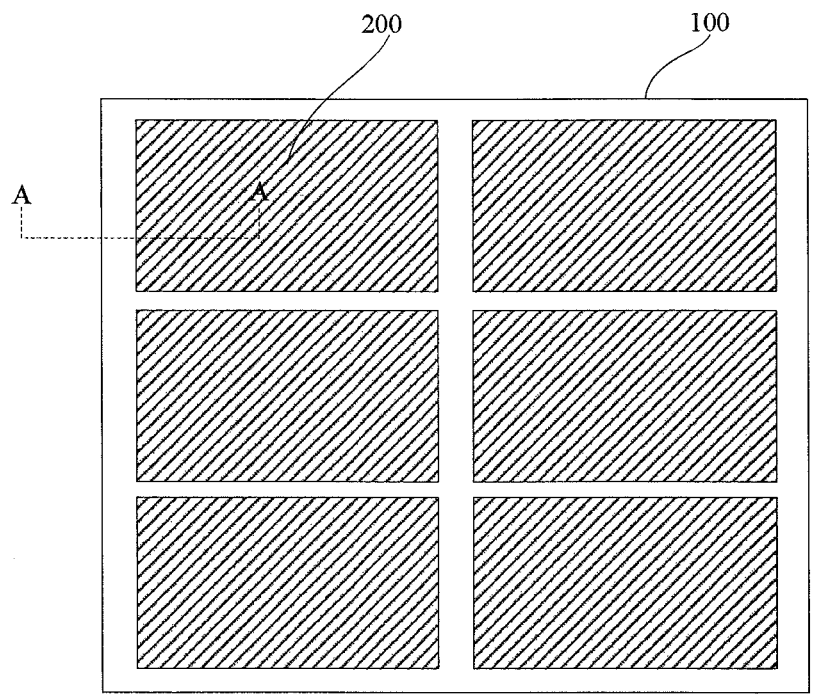
FIG. 1 is a schematic plane view of an alignment layer formed on a mother plate in prior art.
Figure 2:
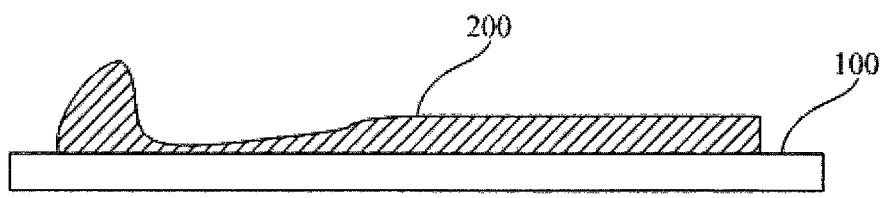
FIG. 2 is an enlarged local cross section schematic view along line A-A of the alignment layer formed on the mother plate shown in FIG. 1.
Figure 3:
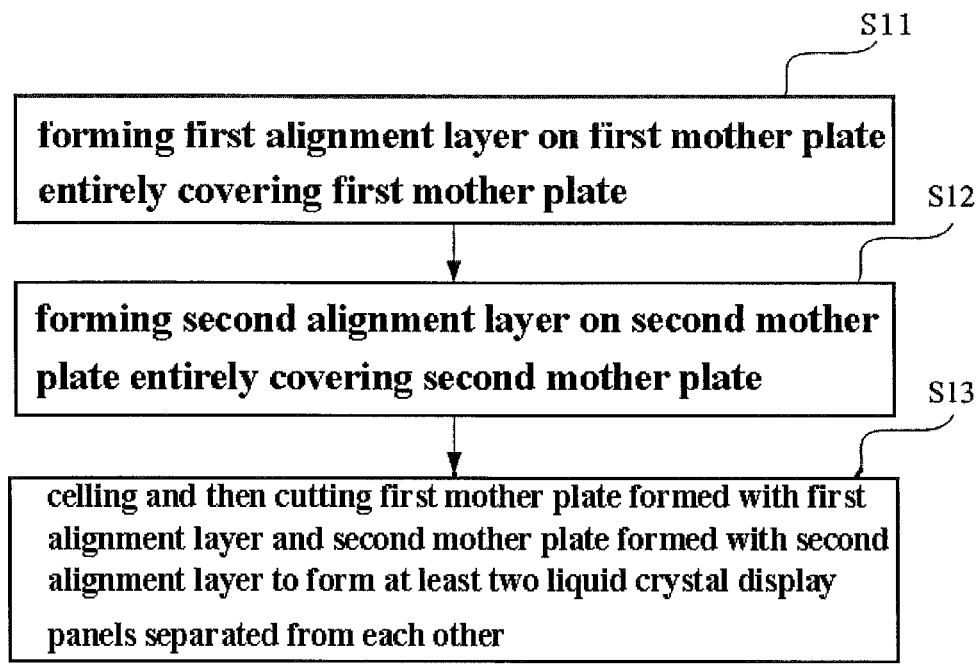
FIG. 3 is a schematic overview flow diagram of a method of manufacturing a liquid crystal display panel according to an exemplary embodiment of the present invention.

As shown in FIG. 3, a method of manufacturing a liquid crystal display panel according to an exemplary embodiment of the present invention mainly includes the following steps:

S11: forming a first alignment layer on a first mother plate that covers the entire first mother plate;

S12: forming a second alignment layer on a second mother plate that covers the entire second mother plate; and S13: ceiling and then cutting the first mother plate formed with the first alignment layer and the second mother plate formed with the second alignment layer, thereby forming at least two liquid crystal display panels separated from each other.

According to an exemplary embodiment of the present invention, if the first mother plate is used as a color filter substrate which is provided with a color resin layer thereon and the second mother plate is used as an array substrate, the method further comprises: a step of forming a color resin layer on the first mother plate before the step of S11; and a step of forming a pixel array on the second mother plate prior to the step of S12.

According to another exemplary embodiment of the present invention, if the color resin layer is disposed on the second mother plate used as an array substrate, the method further comprises a step of forming a pixel array and a color resin layer on the second mother plate prior to the step of S12.

A process of manufacturing a liquid crystal display panel according to an exemplary embodiment of the present invention will be described in detail with reference to an example in which a color resin layer is disposed on a first mother plate used as a color filter substrate.

Figure 4:
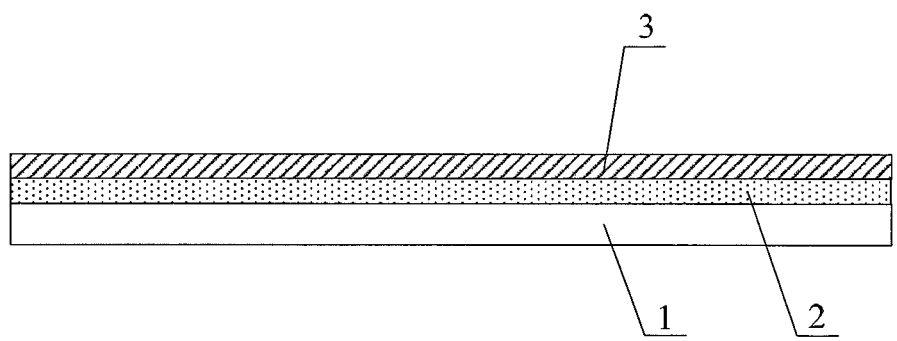
FIG. 4 is a schematic cross section view of a mother plate formed with an alignment layer according to an exemplary embodiment of the present invention.

Referring to FIG. 4, a color resin layer 2 is formed on a glass substrate 1 by a conventional process, and then a liquid alignment material is applied to entirely cover the glass substrate 1 by performing ink-jet printing or platen transfer printing on the glass substrate 1 formed with the color resin layer 2. The liquid alignment material may be, such as, liquid polyimide (PI) having a chemical molecular formula of

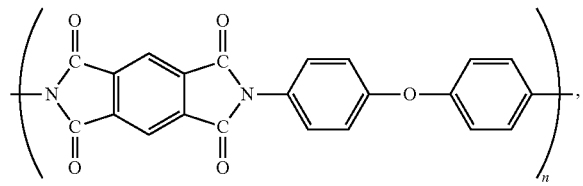

in which n is a positive integral. Then, by heating the entire glass substrate in a thermally curing way, an integral alignment layer is formed from the liquid alignment material. The alignment layer is used as a first alignment layer 3 of the liquid crystal display panel.

The first mother plate obtained in step of S11 is used as a color filter substrate including the color resin layer 2 in the liquid crystal display panel.

The second mother plate obtained in step of S12 is used as the array substrate in the liquid crystal display panel.

In step of S12, a thin-film transistor (TFT) pixel array may be formed on the glass substrate by a conventional process, and then a liquid alignment material is applied to cover the entire glass substrate by performing ink-jet printing or platen transfer printing on the glass substrate provided with the TFT pixel array. The liquid alignment material may be, such as, liquid polyimide (PI). Then, by heating the entire glass substrate in a thermally curing way, an integral alignment layer is formed from the liquid alignment material. The alignment layer is used as a second alignment layer of the liquid crystal display panel.

According to an exemplary embodiment of the present invention, posterior to or prior to celling and then cutting the first mother plate and the second mother plate, the method further comprises a step of removing the first alignment layer at a region corresponding to a first welding area and the second alignment layer at a region corresponding to a second welding area in each liquid crystal display panel.

In the step of removing the first alignment layer at the region corresponding to the first welding area in each liquid crystal display panel prior to celling and then cutting the first mother plate and the second mother plate, a first photoresist layer is provided on the first alignment layer and then the first photoresist layer at the region corresponding to the first welding area is exposed and developed so as to remove the first photoresist layer at the region corresponding to the first welding area and expose the first alignment layer there; then, the exposed first alignment layer at the first welding area is subjected to dry etching, so that the first alignment layer at the region corresponding to the first welding area is removed; subsequently, the remaining first photoresist layer is removed.

In the step of removing the second alignment layer at the region corresponding to the second welding area in each liquid crystal display panel prior to celling and then cutting the first mother plate and the second mother plate, a second photoresist layer is provided on the second alignment layer and then the second photoresist layer at the region corresponding to the second welding area is exposed and developed so as to remove the second photoresist layer at the region corresponding to the second welding area and expose the second alignment layer there; then, the exposed second alignment layer at the second welding area is subjected to dry etching, so that the second alignment layer at the region corresponding to the second welding area is removed; subsequently, the remaining second photoresist layer is removed.

In an exemplary embodiment of the present invention, prior to celling and then cutting the first mother plate and the second mother plate, the first alignment layer on a first seal agent area to be encapsulated with a first seal agent in the first mother plate and the second alignment layer on a second seal agent area to be encapsulated with a second seal agent in the second mother plate are respectively removed.

In an exemplary embodiment of the present invention, the step of removing the first alignment layer from the first seal agent area in the first mother plate includes steps of: forming a third photoresist layer on the first alignment layer, and then exposing and developing the third photoresist layer at the region corresponding to the first seal agent, removing the third photoresist layer corresponding to the first seal agent and exposing the first alignment layer there; then, dry etching the exposed first alignment layer at the first seal agent area to remove the first alignment layer at the first seal agent area; subsequently, removing the remaining third photoresist layer.

In an exemplary embodiment of the present invention, the step of removing the second alignment layer from the second seal agent area in the second mother plate includes steps of: forming a fourth photoresist layer on the second alignment layer, and then exposing and developing the fourth photoresist layer at the region corresponding to the second seal agent, removing the fourth photoresist layer corresponding to the second seal agent and exposing the second alignment layer there; then, dry etching the exposed second alignment layer at the second seal agent area to remove the second alignment layer at the second seal agent area; subsequently, removing the remaining fourth photoresist layer.

Figure 5:
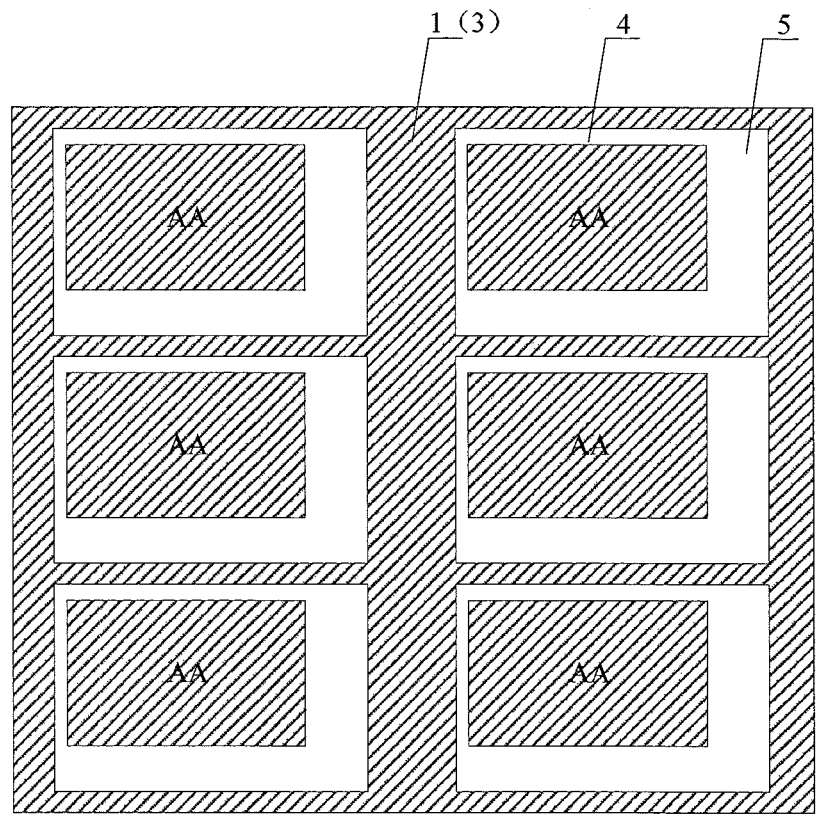
FIG. 5 is a schematic plane view of a mother plate with a welding area and a seal agent area being removed according to an exemplary embodiment of the present invention.

According to an exemplary embodiment of the present invention, the first alignment layer at the region of the first seal agent area and the first welding area, and the second alignment layer at the region of the second seal agent area and the second welding area may be removed in the same process. In addition, the first photoresist layer and the third photoresist layer may be the same photoresist layer, and the second photoresist layer and the fourth photoresist layer may be the same photoresist layer. Specifically, referring to a top-view shown in FIG. 5, based on the step of S11, a photoresist layer is formed on a glass substrate 1, and then by means of a series of processes including, such as, masking, exposing, developing, photolithographing and the like, the photoresist layer at the regions corresponding to a seal agent area 4 and a welding area 5 (PAD area) in a liquid crystal display panel is removed to expose the alignment layer. The exposed alignment layer is subjected to dry etching such that the alignment layer at the region corresponding to the seal agent area 4 and the welding area 5 (PAD area) is removed. As shown in FIG. 5, the areas surrounded by the seal agent area 4 and the welding area 5 (PAD area) are acted as display areas (AA areas). Finally, the remaining photoresist layer is removed.

According to another exemplary embodiment of the present invention, posterior to celling and then cutting the first mother plate and the second mother plate, the first alignment layer at the region corresponding to the first welding area and the second alignment layer at the region corresponding to the second welding area in each liquid crystal display panel are removed.

Specifically, a side of the liquid crystal display panel where the first alignment layer and the second alignment layer are needed to be removed is placed and steeped in a vessel containing an alignment material solution, until the first alignment layer and the second alignment layer are removed. Generally, the first alignment layer and the second alignment layer may be completely removed after steeping for about 20~30 minutes.

Subsequently, the liquid crystal display panel having been steeped in the alignment material solution is placed in a deionized water chamber and then a drying chamber so as to be cleaned and dried.

In the procedure of manufacturing the liquid crystal display panel according to the above embodiments of the present invention, the first alignment layer and the second alignment layer are respectively provided to entirely cover the first mother plate and the second mother plate. Prior to the cutting process, the first alignment layer and the second alignment layer are uniform in thickness at their non-edge area away from their edge areas, although there may be rough areas at their edge areas. Since only the alignment layer at rough areas included in a liquid crystal display panel may negatively affect the design of a bezel region of a twisted nematic liquid crystal display panel having a narrow bezel or a super narrow bezel while the alignment layer at the remaining portion of the liquid crystal display panel is uniform in thickness from edge to center thereof, after performing the cutting process, negative effect of the rough areas in the conventional liquid crystal display panel on design of a narrow bezel or a super narrow bezel is eliminated, and no broken surface will be introduced at edges of the liquid crystal display panel of the present invention. Thus, the width of the bezel region of the liquid crystal display panel fabricated by the method according to an embodiment of the present invention is reduced, and there is no limitation to design of the seal agent area. As for design of a twisted nematic liquid crystal display panel having a narrow bezel or super narrow bezel, process requirements for the narrow bezel or super narrow bezel may be met. Further, by removing the first alignment layer at the regions corresponding to the welding area and the seal agent area in each liquid crystal display panel, and removing the second alignment layer at the region corresponding to the welding area and the seal agent area in each liquid crystal display panel, the problem of wire conduction failure due to overlapping of the seal agent and the alignment layer may be effectively solved.

Figure 6:
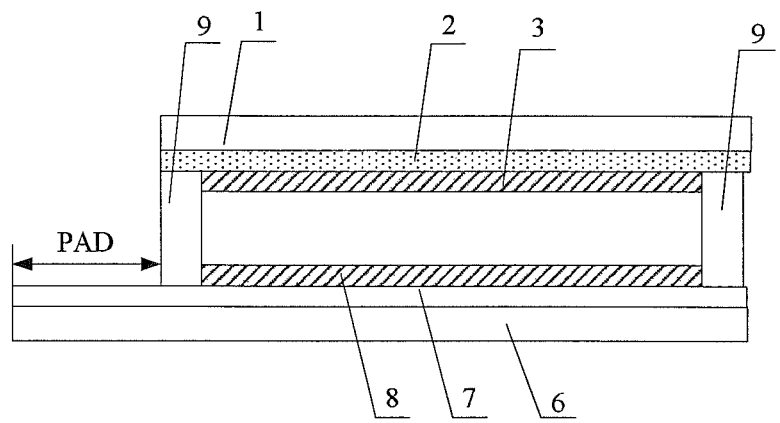
FIG. 6 is a schematic cross section view of a liquid crystal display panel according to an exemplary embodiment of the present invention.

FIG. 6 is a cross section of a liquid crystal display panel according to an embodiment of the present invention fabricated by the above method. The liquid crystal display panel shown in FIG. 6 mainly includes a first substrate 1 and a second substrate 6 arranged opposite to each other; a color resin layer 2 and a first alignment layer 3 provided on the first substrate 1; a pixel array 7 and a second alignment layer 8 disposed on the second substrate 6; and, a seal agent 9 configured to couple the first substrate 1 and the second substrate 6. As shown in FIG. 6, the first alignment layer and the second alignment layer are not provided at the area where the seal agent 9 is located. Thus, the first substrate 1 and the second substrate 6 are directly coupled by the seal agent 9, which improves the coupling reliability. In addition, since the first alignment layer and the second alignment layer are not provided at the area where the seal agent is located, a distance between the color filter substrate and an array substrate is further reduced, thereby achieving a thinner liquid crystal display panel.

The liquid crystal display panel in FIG. 6 is only used for illustrating the present invention, instead of limiting the present invention. It is understood that the liquid crystal display panel according to the present invention may also include other necessary structures, such as, black matrix (BM), polarizing sheet (Pol), etc., the description of which is omitted herein.

According to an embodiment of a further aspect of the present invention, there is provided a liquid crystal display panel, which is fabricated by using the above method of producing a liquid crystal display panel, and may be a high quality liquid crystal display panel with a narrow bezel or super narrow bezel. The liquid crystal display panel may be a liquid crystal panel, a liquid crystal display, a liquid crystal TV, an organic electroluminescent display (organic light emitting diode, OLED) panel, OLED display, OLED TV or electronic paper, etc.

In sum, in the method of manufacturing the liquid crystal display panel according to the above embodiments of the present invention, the first alignment layer and the second alignment layer are provided to entirely cover the first mother plate and the second mother plate, respectively. Prior to the cutting process, the first alignment layer and the second alignment layer are uniform in thickness at their non-edge areas away from their edge areas, although there may be rough areas at their edge areas. Since only the alignment layer at rough areas included in a liquid crystal display panel may negatively affect the design of a bezel region of a twisted nematic liquid crystal display panel having a narrow bezel or a super narrow bezel while the alignment layer at the remaining portion of the liquid crystal display panel is uniform in thickness from edge to center thereof, after performing the cutting process, negative effect of the rough areas in the conventional liquid crystal display panel on design of a narrow bezel or a super narrow bezel is eliminated, and no broken surface will be introduced at edges of the liquid crystal display panel of the present invention. The bezel region of the liquid crystal display panel is reduced in width, and there is no limitation to design of the seal agent area. As for design of a twisted nematic liquid crystal display panel having a narrow bezel or super narrow bezel, process requirements for the narrow bezel or super narrow bezel may be met. Further, by removing the first alignment layer at the regions corresponding to the welding area and the seal agent area in each liquid crystal display panel, and removing the second alignment layer at the region corresponding to the welding area and the seal agent area in each liquid crystal display panel, the problem of wire conduction failure due to overlapping of the seal agent and the alignment layer may be avoided.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

The invention claimed is:

1. A method of manufacturing a liquid crystal display panel, comprising steps of:
    forming a first alignment layer on a first mother plate entirely covering the first mother plate;
    forming a second alignment layer on a second mother plate entirely covering the second mother plate; and
    celling and then cutting the first mother plate formed with the first alignment layer and the second mother plate formed with the second alignment layer, so as to form at least two liquid crystal display panels separated from each other.

2. The method according to claim 1, further comprising a step of:
    posterior to or prior to celling and then cutting the first mother plate and the second mother plate, removing the first alignment layer at the region corresponding to a first welding area and the second alignment layer at the region corresponding to a second welding area in each liquid crystal display panel.

3. The method according to claim 2, wherein,
    in the step of removing the first alignment layer at the region corresponding to the first welding area, a first photoresist layer is formed on the first alignment layer and then the first photoresist layer at the region corresponding to the first welding area is exposed and developed so as to remove the first photoresist layer at the region corresponding to the first welding area, and expose the first alignment layer at the first welding area; then, the exposed first alignment layer at the first welding area is subjected to dry etching, so that the first alignment layer at the region corresponding to the first welding area is removed; subsequently, the remaining first photoresist layer is removed;
    in the step of removing the second alignment layer at the region corresponding to the second welding area, a second photoresist layer is formed on the second alignment layer and then the second photoresist layer at the region corresponding to the second welding area is exposed and developed so as to remove the second photoresist layer at the region corresponding to the second welding area, and expose the second alignment layer at the second welding area; then, the exposed second alignment layer at the second welding area is subjected to dry etching, so that the second alignment layer at the region corresponding to the second welding area is removed; subsequently, the remaining second photoresist layer is removed.

4. The method according to claim 1, further comprising a step of: prior to ceiling and then cutting the first mother plate and the second mother plate, removing the first alignment layer on a first seal agent area to be encapsulated with a first seal agent in the first mother plate and the second alignment layer on a second seal agent area to be encapsulated with a second seal agent in the second mother plate are respectively removed.

5. The method according to claim 4, wherein,
    in the step of removing the first alignment layer at the first seal agent area, a third photoresist layer is formed on the first alignment layer, and the third photoresist layer at the region corresponding to the first seal agent is exposed and developed to remove the third photoresist layer at the region corresponding to the first seal agent and expose the first alignment layer; then, the exposed first alignment layer at the first seal agent area is subjected to dry etching, such that the first alignment layer at the first seal agent area is removed; subsequently, the remaining third photoresist layer is removed;
    in the step of removing the second alignment layer at the second seal agent area, a fourth photoresist layer is formed on the second alignment layer, and the fourth photoresist layer at the region corresponding to the second seal agent is exposed and developed to remove the fourth photoresist layer corresponding to the second seal agent and expose the second alignment layer; then, the exposed second alignment layer at the second seal agent area is subjected to dry etching, such that the second alignment layer at the second seal agent area is removed; subsequently, the remaining fourth photoresist layer is removed.

6. The method according to claim 2, wherein,
    in the step of removing the first alignment layer at the region corresponding to the first welding area and the second alignment layer at the region corresponding to the second welding area, the side of the liquid crystal display panel where the first alignment layer and the second alignment layer are needed to be removed is placed and steeped in a vessel containing an alignment material solution, until the first alignment layer and the second alignment layer are removed; and
    the liquid crystal display panel having been steeped in the alignment material solution is subsequently placed in a deionized water chamber and a drying chamber so as to be cleaned and dried.

7. The method according to claim 1, wherein,
    in the step of forming the first alignment layer entirely covering the first mother plate, a liquid alignment material is applied to entirely cover the first mother plate by means of ink-jet printing or platen transfer printing, and then the first mother plate is heated in thermally curing way such that the liquid alignment material covering the first mother plate is formed as an integral first alignment layer;
    in the step of forming the second alignment layer entirely covering the second mother plate, a liquid alignment material is applied to entirely cover the second mother plate by means of ink-jet printing or platen transfer printing, and then the second mother plate is heated in thermally curing way such that the liquid alignment material covering the second mother plate is formed to an integral second alignment layer.

8. The method according to claim 7, wherein,
    the liquid alignment material is polyimide.

* * * * *